Patented Dec. 20, 1938

2,140,793

UNITED STATES PATENT OFFICE

2,140,793

TREATMENT OF SOYA BEAN OIL

Albert K. Epstein, Harold L. Reynolds, and Myron L. Hartley, Chicago, Ill.; said Hartley assignor to said Epstein and said Reynolds assignor to The Emulsol Corporation, Chicago, Ill.

No Drawing. Application July 29, 1937, Serial No. 156,344

20 Claims.  (Cl. 260—420)

Our invention relates to the treatment of certain types of oils, especially soya bean oil, and is particularly concerned with improving the quality thereof whereby its utility in the field of edible oils and fats is markedly increased.

It has been known for some considerable time that edible soya bean oil, including edible soya bean oil which has been refined, bleached and deodorized under the best existing commercial methods, undergoes a type of spoilage which is characterized as "reversion" when exposed to light and air and, even though somewhat more slowly, when stored in the absence of light and air. This reversion manifests itself in an acquisition by the soya bean oil of various off-flavors such as "beany" flavor, or sometimes described as fishy, which subsequently often become intensified and altered with the production of other undesirable flavors described as "oleo" and "grassy" or "fishy". This type of spoilage is characteristic of soya bean oil. Even when edible, refined, bleached and deodorized soya bean oil is subjected to hydrogenation to produce a product having a melting point of from about 95° F. to 100° F., said partially hydrogenated oil also reverts, particularly when exposed to air and light, after a few days and acquires an oleo-like flavor which becomes intensified with time. Even when the oil is kept in the dark, the above type of spoilage occurs in the bean oils in the course of time.

As a result of the disadvantageous properties of soya bean oil, as briefly described above, considerable difficulties and objections have been encountered in utilizing this oil in the food industries, such as in salad oil and particularly in dry plastic shortenings and in margarine. In the manufacture of margarine especially, reversion takes place relatively more quickly because of the presence of moisture and other substances. While there is a decided advantage from an economic standpoint to employ soya bean oil in the food industries, primarily because of the abundance and ready sources and availability of such oil, nevertheless the problems encountered have acted as definite deterrents to the stimulation of such uses of soya bean oil.

We have discovered that, by treating soya bean oil with certain reagents in certain proportions and under proper temperature and pressure conditions, products are obtained which keep in good condition without reversion for periods of time substantially in excess of the time before reversion sets in without the treatment of our invention. The practical effect of this treatment is that the commercial utility of soya bean oil in the food industry is tremendously increased.

The improvement in the soya bean oil by reason of our treatment thereof manifests itself also in other respects, the most notable of which appears to lie in the reduction of color of the treated oil. As will be pointed out more fully hereinafter, in some instances this reduction in color is very substantial.

It is accordingly an object of our invention to improve soya bean oil, particularly to enhance its utility for use in food products.

Another object of our invention concerns itself with substantially extending the stability or "pre-reversion" period of soya bean oil.

Still another object of our invention resides in reducing the color of soya bean oil.

Another object of our invention deals with the provision of a novel method of treating soya bean oil to improve the same, particularly with reference to extending or prolonging the period preceding reversion or, in other words, the pre-reversion period.

Yet another object of our invention is the provision of a novel soya bean oil possessing the property of keeping for relatively long periods of time without development of off-flavors.

Another of the objects of our invention is concerned with the development of a method of treating soya bean oil to improve the same, especially with regard to extending the period preceding reversion, which method may easily be combined and coordinated with present practices in the art of treating edibles oils and fats, particularly with respect to the refining thereof.

With these objects in view and others which will appear as the nature of our invention is made clear in the light of the following description, we shall address ourselves to fully explaining the various phases of our invention.

In general, our invention is predicated on the discovery that when certain polyhydroxy substances are added in very small amounts to soya bean oil and the oil is subjected to elevated temperatures, particularly under reduced pressures, in the presence of steam or other non-oxidizing vapor or gas, such as nitrogen or hydrogen, the resulting oil possesses new properties, its pre-reversion period is substantially prolonged and it undergoes a definite reduction in color. The steam or non-oxidizing gas serves to sweep out the volatile constituents of the oil undergoing treatment.

We have found that, in order to achieve our best results, the soya bean oil admixed with the polyhydroxy substance must be treated in a non-oxidizing atmosphere such as steam, nitrogen, carbon dioxide or the like, particularly under reduced pressure, and at temperatures of the order of those employed in edible oil deodorization commercial processes, namely, about 420° F. to 500° F., preferably at the higher temperatures. Under these conditions, a reaction evidently takes place between some of the constituents of the soya bean oil and the polyhydroxy substance and it is our belief that it is this reaction product which forms at the elevated temperatures which is responsible for the prolongation of the good flavor and retards the development of the so-called "beany" or "fishy" flavor in the soya bean oil. The use of elevated temperatures also serves, with the steam or other non-oxidizing gas, to deodorize the bean oil and to volatilize any undesirable constituents formed by the interaction of the polyhydroxy substance and some of the constituents of said oil. Although we have not yet fully ascertained the mechanism of the reaction which takes place and appears to account for this unusual and unexpected retardation of the development of "beany" or specific off-flavors in the treated soya bean oil, it is our present theory that the polyhydroxy substance reacts with the conjugated double bonds of the coloring matter, such as carotene, present in the soya bean oil. We postulate this theory because, in general, simultaneously with the improvement of the keeping properties or prolongation of the prereversion period of the soya bean oil, there is also a bleaching effect upon or reduction of color of said oil. While we are not to be bound by any theoretical considerations, we have offered the same as a possible explanation of why we obtain the results which we have already generally described and which will be more fully detailed hereinafter. At any rate, that a reaction takes place under the conditions of our treatment cannot be gainsaid since the mere addition of the polyhydroxy substances to soya bean oil does not serve to prolong or extend the prereversion period thereof. The polyhydroxy substances, used at the high temperatures under the conditions specified, appear to exert a catalytic effect with a resultant marked improvement of the soya bean oil.

The polyhydroxy substances which we have found efficacious for our present purposes are of varied character but are preferably of lower molecular weight and aliphatic in character and include, among others, glycerol, glycols and polyglycols such as ethylene glycol and diethylene glycol, mannitol, sorbitol, and other hexahydric alcohols such as dulcitol and arabitol, and the like. Of these, for practical purposes, glycerol and diethylene glycol have been found to be most suitable and, from an edible standpoint, glycerol is much preferred.

Generally speaking, crude soya bean oil, produced by the expeller process or by the solvent process, contains a fraction of one per cent of free fatty acids, this, however, being variable. Such oil is refined in accordance with conventional processes involving neutralization of the free fatty acids with alkali or alkaline materials, removal of the resulting soap, drying, and bleaching with such agents as fuller's earth or carbon black. The oil may then, if desired, be hydrogenated in accordance with known practice to produce a product having a melting point of about 95° F. to 100° F. whereby it may be employed as a constituent of margarine or dry bakery shortenings. If desired, the hydrogenated soya bean oil may be washed again with a slight amount of alkali and introduced into a deodorizing kettle and deodorized with superheated steam under reduced pressure.

We have found that we obtain excellent results with economy of treatment if the polyhydroxy substances, in proper proportions, are added to the soya bean oil just prior to the deodorization thereof with superheated steam under reduced pressure. The subjection of the soya bean oil, admixed with the polyhydroxy substances, to these conditions of temperature and reduced pressure produces a definite change in the oil in that some constituent or constituents of the soya bean oil which cause or promote reversion become fixed and inactive while undesirable constituents formed or present become volatilized, thereby producing a product which keeps in good condition for relatively long periods of time without development of oleo-like or fishy or grassy flavors.

It must not be inferred that our process is limited to the treatment of hydrogenated soya bean oil or that the polyhydroxy substances must be introduced into the oil at any particular phase of the process of treatment or refining thereof. Our process is also applicable to the treatment of liquid or non-hydrogenated soya bean oil. Furthermore, the polyhydroxy substances may be added at any suitable stage of the process of treating the soya bean oil. It is only necessary that the mixture of the soya bean oil and the polyhydroxy substances be subjected to a temperature sufficiently high to react, as, for example, about 400° F. to 500° F. under reduced pressure for the requisite length of time, which will vary with the size of the batch undergoing treatment, generally a matter of one hour or several hours during which period the oil is also deodorized. While the soya bean oil admixed with the polyhydroxy substance could be subjected to the heat treatment in an inert or substantially non-oxidizing atmosphere, such as indicated above, followed by steam deodorization under reduced pressure at elevated temperatures of the character described, we have found it to be considerably more economical and somewhat better results are obtained if the treatment is effected as a part of and concomitant with the steam deodorization treatment to which the oils are subjected, the time being sufficiently long, generally six or seven hours in large scale commercial operations, so as to drive off undesirable volatile constituents present in the oil or which might be formed in the reaction.

The following examples are illustrative of methods of practicing our invention. It will be understood, however, that said examples are given by way of illustration only and are not to be construed as limitative of the full scope of our invention as taught herein.

*Example A*

To a partially hydrogenated soya bean oil having a melting point of 100° F. there was added 0.02% by weight of glycerol and the mixture was heated with superheated steam for six hours at a temperature of 500° F. at an absolute pressure of 7 mm. of mercury to remove undesired volatile constituents. In an accelerated test made by placing a sample of the oil thus treated in a bottle and exposing it to light, the oil kept in good condition for twelve days. A batch similarly treated but employing 0.3% of glycerol, based on the weight of the oil, and another batch similarly treated but utilizing 0.05% of glycerol, based on the weight of the oil, kept 16 days and 10 days, respectively. Another batch similarly treated but omitting the glycerol kept only two days before reversion set in under the same accelerated test. The use of greater percentages of glycerol, such as 0.5% or 1%, based on the weight of the oil, produces no better results and, as a matter of fact, much of the glycerol distills off at the elevated temperatures utilized. It should be noted that, at an absolute pressure of 7 mm. of mercury, glycerol boils at approximately 325° F. Hence, under the operating pressure and temperatures indicated, the tendency of the glycerol to volatilize is manifest. It is, therefore, very surprising that the results described should be obtained. It may be that the glycerol vapors act as a catalyst or unite with double bonds present in the coloring matter of the soya bean oil as previously suggested.

Example B

Crude soya bean oil was refined in the conventional way by neutralization with alkali, removal of the resulting soap, drying and bleaching. It was then mixed with 0.1% by weight of glycerol and the mixture was heated at 495 degrees F. at a reduced absolute pressure of 6.5 mm. of mercury for a period of several hours until undesired volatile constituents were removed. In an accelerated test, as described in Example A, the oil thus treated had keeping qualities superior to a sample similarly treated but without the addition of the glycerol.

Example C

To a soya bean oil partially hydrogenated so that it had a melting point of 100 degrees F. there was added 0.1% by weight of diethylene glycol. The resulting mixture was then heated at 500 degrees F. with superheated steam under a reduced pressure of 7 mm. of mercury for seven hours to remove undesired volatile constituents. In an accelerated test, as described in Example A, the treated oil kept in good condition for 25 days as against 3 days for a sample similarly treated but without the addition of the diethylene glycol. A batch of the same oil similarly treated but employing 0.3% of diethylene glycol, based on the weight of the oil, resulted in a product which kept in good condition for 18 days.

Example D

To a partially hydrogenated soya bean oil having a melting point of between 95 degrees F. and 100 degrees F. there was added 0.02% by weight of mannitol and the mixture was heated with superheated steam for six hours at a temperature of 490 degrees F. at an absolute pressure of 7 mm. of mercury to remove undesired volatile constituents. In an accelerated test, as described in Example A, the oil thus treated kept in good condition for 10 days as against between 2 and 3 days for a sample similarly treated but without the addition of the mannitol.

Example E

To a partially hydrogenated soya bean oil having a melting point of approximately 100 degrees F. there was added 0.1% by weight of ethylene glycol and the resulting mixture was heated at 485 degrees F. with superheated steam at an absolute pressure of 6.5 mm. of mercury for 5 hours until undesired volatile constituents were removed. In an accelerated test, as described in Example A, the oil thus treated kept in good condition for several days more than a sample similarly treated but without the addition thereto of the ethylene glycol.

The proportions of the polyhydroxy substances employed are generally somewhat critical. In general, we have found that if substantially in excess of 0.5% of the polyhydroxy substance, based on the weight of the soya bean oil, is employed the results obtained are not quite so satisfactory as when small proportions are utilized. In those cases where increased amounts of the polyhydroxy substances are not positively detrimental, their use ordinarily is not justified since smaller amounts function just as effectively at less cost. Thus, for example, the use of 0.2% glycerol is essentially as effective as 1% glycerol, much glycerol being distilled off during the treatment and thereby serving no useful purpose. The proportions vary somewhat with particular soya bean oils and, as a general rule, liquid soya bean oil requires greater proportions of the polyhydroxy substances than is required in the treatment of hydrogenated or partially hydrogenated soya bean oil. Moreover, it will be appreciated that the various polyhydroxy substances possess varying efficacies which obviously affects the amounts to be employed for optimum results. In general, bearing in mind the statements made above and the variability of different factors, we employ proportions ranging between about 0.005% or 0.01% and 0.5% of the polyhydroxy substances, and preferably from 0.02% to 0.1%.

We have referred hereinabove to the temperatures which are utilized in our process. It is evident that any temperature, sufficiently high to effect the reaction between the polyhydroxy substances and the soya bean oil but not so high as to have an undesirable effect on the oil or to cause objectionable decomposition to take place, may be employed. We have stated that temperatures of 400° F. to 500° F. have proven satisfactory. Excellent results have been obtained at about 430° F. to 500° F. In general, to reiterate, the temperature must be high enough to volatilize, with the superheated steam or the like, the undesirable volatile constituents present in the oil and those which may be formed as reaction products.

The degree of vacuum utilized is, of course, subject to variation. Excellent results have been obtained with absolute pressures of 6.5 mm. to 15 mm. of mercury but the operative range extends beyond either limit. In general, other things being equal, at low pressures the quality of the products obtained is an inverse function of the pressure, i. e., the lower the pressure, the better the product.

As we have previously stated, concomitantly with the extension or prolongation of the prereversion period of the soya bean oil as a result of our treatment, there is as a general rule, a reduction in color over and above that which is due to the steam deodorization treatment in those instances where we utilize our process in conjunction therewith. For example, with some partially hydrogenated soya bean oils having a melting point of about 100° F., the color has been reduced by my treatment from about 13 Yellow and 1.3 Red (Lovibond Scale) to from 4 to 3 Yellow and about 0.4 to 0.3 Red. In some cases of the treatment of liquid soya bean oil, our process has reduced the color from 35 Yellow and 8 Red to 6 to 7 Yellow and 0.5 Red. We have found that some types of soya bean oil undergo somewhat of a bleaching or reduction in color during steam deodorization thereof when the polyhydroxy substances are not employed. However, such oils acquire a beany, fishy, grassy, or oleo-like flavor relatively quickly. If, however, as we have described, the same oil is subjected to the same temperature and deodorization treatment but in the presence of the polyhydroxy substances incorporated therein prior to subjection to deodorization, there is an improvement not only in color but also in the keeping properties of the oil.

What we claim as new and desire to protect by Letters Patent of the United States is:

1. In a method of improving soya bean oil, particularly with respect to extending its pre-reversion period, the steps which comprise mixing said oil with not substantially in excess of 0.5% of an aliphatic polyhydroxy substance, based on the weight of the oil, and heating the resulting mixture under reduced pressure at sufficiently high edible oil deodorization temperatures for a length of time sufficient to drive off undesirable constituents.

2. In a method of improving soya bean oil, particularly with respect to extending its pre-reversion period, the steps which comprise mixing said oil with between about 0.01% and 0.5% of an aliphatic polyhydroxy substance, based on the weight of the oil, and heating the resulting mixture under reduced pressure at a temperature between about 400° F. and 500° F. for a length of time sufficient to substantially deodorize the oil.

3. In a method of improving soya bean oil, particularly with respect to extending its pre-reversion period, the steps which comprise mixing said oil with not substantially in excess of 0.5% of an aliphatic polyhydroxy substance, based on the weight of the oil, and heating the resulting mixture under reduced pressure and in the presence of superheated steam at edible oil deodoration temperatures for a length of time sufficient to substantially deodorize the oil.

4. In a method of improving soya bean oil, particularly with respect to extending its pre-reversion period, the steps which comprise mixing said oil with between about 0.01% and 0.5% of a water-soluble, aliphatic polyhydric alcohol, based on the weight of the oil, and heating the resulting mixture under reduced pressure and in the presence of super-heated steam at edible oil deodorization temperatures for a length of time sufficient to substantially deodorize the oil.

5. The process of claim 1 wherein the polyhydroxy substance is glycerol.

6. The process of claim 2 wherein the polyhydroxy substance is glycerol.

7. The process of claim 4 wherein the polyhydric alcohol is glycerol.

8. The process of claim 1 wherein the soya bean oil, prior to treatment with the polyhydroxy substance, has been at least partially refined and hydrogenated.

9. The process of claim 4 wherein the soya bean oil, prior to treatment with the polyhydric alcohol, has been at least partially refined and hydrogenated.

10. Soya bean oil, having an improved color and a substantially extended pre-reversion period, comprising the reaction product, under reduced pressure and at deodorization temperatures, of soya bean oil and not substantially in excess of 0.5% of an aliphatic polyhydroxy substance based on the weight of said oil.

11. Soya bean oil, having an improved color and a substantially extended pre-reversion period, comprising the reaction product, under reduced pressure, in the presence of super-heated steam, and at deodorization temperatures, of soya bean oil and between about 0.01% and 0.5% of an aliphatic water-soluble polyhydroxy substance based on the weight of said oil.

12. Soya bean oil, having an improved color and a substantially extended pre-reversion period, comprising the reaction product, under reduced pressure and at deodorization temperatures, of soya bean oil and not substantialy in excess of 0.5% of glycerol, based on the weight of said oil.

13. Partially hydrogenated soya bean oil, having an improved color and a substantially extended pre-reversion period, comprising the reaction product, under reduced pressure and at deodorization temperatures, of soya bean oil or the like and not substantially in excess of 0.5% of an aliphatic polyhydroxy substance based on the weight of said oil.

14. Partially hydrogenated soya bean oil, having an improved color and a substantially extended pre-reversion period, comprising the reaction product, under reduced pressure, in the presence of super-heated steam, and at deodorization temperatures, of soya bean oil and between about 0.01% and 0.5% of glycerol based on the weight of said oil.

15. The method of improving liquid or partially hydrogenated soya bean oil, particularly with respect to extending its pre-reversion period, which comprises mixing said oil with not substantially in excess of 0.5% of glycerol, and heating the resulting mixture under an absolute pressure of about 6.5 mm. to 15 mm. of mercury at a temperature of between about 400° F. and 500° F. for several hours in the presence of superheated steam to remove volatile constituents, the percentage of glycerol being based on the weight of the oil.

16. The method of improving soya bean oil, particularly with respect to extending its pre-reversion period, which comprises mixing said oil with between about 0.01% and 0.5%, based on the weight of the oil, of diethylene glycol and heating the resulting mixture under reduced pressure at a temperature between about 400° F. and 500° F. for several hours in the presence of superheated steam to remove volatile constituents.

17. Liquid or at least partially hydrogenated soya bean oil, having improved color and a substantially extended pre-reversion period, comprising the reaction product, under reduced pressure in the presence of superheated steam and at temperatures between 400° F. and 500° F., of soya bean oil and not substantially in excess of 0.5%, based on the weight of the oil, of glycerol.

18. In a method of improving soya bean oil, particularly with respect to extending its pre-reversion period, the steps which include mixing said oil with from about 0.01% to 0.5% of an aliphatic polyhydric alcohol, based on the weight of the oil, and heating the resulting mixture in a substantially non-oxidizing atmosphere at a temperature of the order of about 400° F. to 500° F. for a substantial period of time.

19. In a method of improving soya bean oil, particularly with respect to extending its pre-reversion period, the steps which comprise mixing said oil with between about 0.05% and 0.5% of an aliphatic polyhydric alcohol, based on the weight of the oil, and heating the resulting mixture under an absolute pressure of about 6.5 mm. to 15 mm. of mercury at a temperature of about 475° F. to 500° F. for several hours in the presence of superheated steam to effect a reaction between the polyhydric alcohol and the oil or a constituent thereof and to remove volatile constituents.

20. The method of claim 19 wherein the polyhydric alcohol is glycerol.

ALBERT K. EPSTEIN.
HAROLD L. REYNOLDS.
MYRON L. HARTLEY.